United States Patent [19]

Uchiyama et al.

[11] Patent Number: 4,797,816
[45] Date of Patent: Jan. 10, 1989

[54] VIRTUAL MEMORY SUPPORTED PROCESSOR HAVING RESTORATION CIRCUIT FOR REGISTER RECOVERING

[75] Inventors: Kunio Uchiyama, Hachioji; Tadahiko Nishimukai, Sagamihara, both of Japan

[73] Assignee: Hitachi, Ltd., Tokyo, Japan

[21] Appl. No.: 822,231

[22] Filed: Jan. 24, 1986

[30] Foreign Application Priority Data

Jan. 28, 1985 [JP] Japan .................. 60-12394

[51] Int. Cl.$^4$ ............................................. G06F 12/08
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,979,725 | 9/1976 | Disparte et al. | 364/200 |
| 4,287,559 | 9/1981 | Easley et al. | 364/200 |
| 4,318,172 | 5/1982 | Yamada et al. | 364/200 |
| 4,520,441 | 4/1985 | Bandoh et al. | 364/200 |
| 4,524,415 | 6/1985 | Mills, Jr. | 364/200 |

*Primary Examiner*—Archie E. Williams, Jr.
*Assistant Examiner*—Emily Y. Chan
*Attorney, Agent, or Firm*—Antonelli, Terry & Wands

[57] ABSTRACT

A register recovering system for a data processor having a group of general-purpose registers includes a saving register for saving the content of the general-purpose register; a control register for storing discrimination information for the general-purpose register; a setting unit for setting the discrimination information at the control register, based on instruction information of a machine code to be processed by the data processor; and a setting unit for setting the content of the saving register to the general-purpose register in accordance with the discrimination information stored in the control register.

8 Claims, 5 Drawing Sheets

| MODE 5,4,3 | CONTENT OF MODE |
|---|---|
| 0 0 0 | DATA REGISTER |
| 0 0 1 | ADDRESS REGISTER |
| 0 1 0 | ADDRESS REGISTER INDIRECT |
| 0 1 1 | POSTINCREMENT |
| 1 0 0 | PREDECREMENT |
| 1 0 1 | INDEXED ADDRESS REGISTER INDIRECT |
| 1 1 0 | INDEXED PROGRAM COUNTER |
| 1 1 1 | ABSOLUTE ADDRESS |

VIRTUAL MEMORY SUPPORTED PROCESSOR HAVING RESTORATION CIRCUIT FOR REGISTER RECOVERING

BACKGROUND OF THE INVENTION

The present invention relates to a support of a virtual memory provided in processor, and more particularly to a register recovering system necessary for instruction re-execution.

There is a tendency to attain a virtual memory capability, which has been provided heretofore only for a relatively large computer, even of a microprocessor by virtue of improvements on integration density and performance of the microprocessor.

In a virtual memory system, a virtual address space for the user is divided into certain fixed-sized pages, and the respective pages are mapped into a physical memory. In case a program makes access to a page not present in the physical memory, a page fault occurs to interrupt the processor and initiate an exception processing. In the fault handler routine, the page is fetched from an external storage to substitute it for another page of the physical memory. During this replacement operation, the processor executes a different program. After the replacement operation terminates, the processor resumes the execution of the page-faulted program. To support a virtual memory and virtual machine operations, it is therefore necessary to execute a different program after suspension of the page-faulted program and thereafter resume the execution of the suspended program. The processor must therefore be provided with a function to support such operation.

The methods to realize such a function are mainly divided into two methods: the instruction continuation method and the instruction restart method. The former is adopted in a microprocessor MC68010 manufactured by Motorola Corp., the contents of which is described in "Virtual Memory and the MC68010" IEEE MICRO, Vol. 3, No. 3, June 1983, pp. 24 to 39. With this method, when a page fault is detected during execution of instructions, the execution of the instructions is suspended and the internal state of the processor at that time is saved in stacks. After the exception handler routine solves the page fault, saved information in the stacks is again recovered to the processor to resume execution of the suspended instructions starting from where the instructions were suspended. Disadvantages associated with this method are enumerated in the following two points.

(1) The internal state of the processor depends on its architecture, so that the number of saving stacks differs for each processor. Therefore, even those processors belonging to the same family have no compatibility with each other.

(2) The number of saving stacks tends to become large as the architecture of the processor becomes complicated, thus occupying a larger memory space. In addition, it takes more time to save and recover. There are many processors adopting the instruction restart method because of the above-noted disadvantages of the instruction continuation method of virtual memory support. In the instruction restart method, upon detection of a page fault during execution of instructions, the processor is interrupted and the fault handler routine eliminates the page fault. In this case, the execution of the instructions where the page fault was detected is restarted from the beginning.

The instruction restart method can solves the above disadvantages of the instruction continuation method. However, there is a problem of recovering the contents of user-visible registers. That is, it is necessary to recover the contents of registers before re-execution of the instructions in order that the result of re-execution of the page faulted instructions becomes equal to the result of normal execution of the instructions which would be obtained in case of no page fault.

One method to solve the problem of register recovery is to not alter the contents of registers until a page fault occurs and it becomes impossible to execute the instructions. With this method, although the amount of hardware used for this purpose is small, it is necessary to delay the alteration of the contents of registers for a certain time interval. As a result, the time required for execution of instructions becomes long which deteriorates the processor performance.

According to a second method a copying register is provided for each register. At the start of execution of instructions, the content of each register is copied and saved in each corresponding copying register. If a page fault occurs during execution of instructions, the content of the copying register is restored to the corresponding register. With this method, however, a large amount of hardware is required, which is hard to realize in view of the currently available intergration density of a microprocessor.

According to a third method, if the content of a register is altered by storing therein a word read out based on the effective address obtained through addition of a displacement to the content of the register in execution of one instruction, the name of the altered register and the value of the displacement used for alteration are tagged and saved in a specified control register. The content of the register is reconstructed, before the re-execution, by subtracting the displacement from the effective address. This method, however, must properly be arranged with due regard to the instruction system of the processor, e.g., the timings of saving, the content of save information, or the like. A processor adopting this method is, for example, a 16 bit microprocessor J11 manufactured by Digital Equipment Corp. The problem of register recovery is still unsettled in this method for supporting Move instruction for plural words. In particular, if a page fault occurs while reading plural words from the physical memory and storing them in the respective registers, a problem exists as to how the contents of registers are reconstructed based on the displacement value.

SUMMARY OF THE INVENTION

An object of the present invention is to provide a register recovering system with a short overhead in performance and small quantity of hardware, in the instruction restart method for a virtual memory support.

To realize a register recovering system achieving the above object, it is necessary to analyze the sequence of instruction executions of the processor. In case the content of a register is altered after completion of all of the memory accesses during execution of one instruction, there is no page fault after the alteration of the register so that no positive measure is needed. Contrary to the above, in case memory accesses are performed after or simultaneously with alteration of the contents of registers, there is a possibility of detecting a page fault during the memory accesses. In case of a page fault, it is necessary to restore the contents of registers to re-execute the instructions. Such cases are for example as in the following.

(1) Operand Access in Postincrement Addressing Mode

The content of a register is used as the effective address of an operand access to the memory, and simultaneously therewith the content of the register is incremented by a constant number (e.g., 1, 2, 4).

(2) Operand Access in Predecrement Addressing Mode.

After decrementing the content of a register by a constant number, the decremented content is used as the effective address to access to the memory.

(3) In Move Multiple-Register Instruction for Transferring Plural Words of Memory to Registers, Cases Using the Following Addressing Modes:

(i) Register Indirect Mode.

The content of a register is used as the effective address of an operand.

(ii) Register Indirect Mode with Displacement.

The sum of the content of a register and a displacement becomes the effective address of an operand.

(iii) Indexed Register Indirect Mode.

The sum of the contents of a register, index register and displacement becomes the effective address of an operand.

(iv) Index Program Counter Mode.

The sum of the contents of a program counter, index register and displacement becomes the effective address of an operand.

In the re-execution of instructions, the present invention provides that only the values of registers necessary for calculation of the effective address of an operand are recovered. In particular, as to the above (1) and (2), the content of a register before increment or decrement is saved to recover its value prior to the re-execution of instructions. Also, as to the above (3), the contents of a register and index register used in a register indirect addressing mode are saved to recover their values prior to the re-execution of instructions. In the case of Move Multiple instruction, the contents of registers other than those registers necessary for calculation of the effective address of an operand are not recovered. The re-execution of instructions in this state gives no contradiction in its result since the same values are moved to the registers.

DESCRIPTION OF THE PREFERRED EMBODIMENT

As previously described, upon detection of a page fault during execution of instructions in a virtual memory system, the processor is interrupted and the page replacement on the physical memory is performed by means of the exception handler routine. After the page fault is eliminated, execution of the page faulted instructions is restarted from the beginning for the case of a virtual memory system in the instruction restart method. In this method, the content of a register should be restored to have the initial content. It is noted that the most important point to realize for a virtual memory is register recovery.

Figure 4:
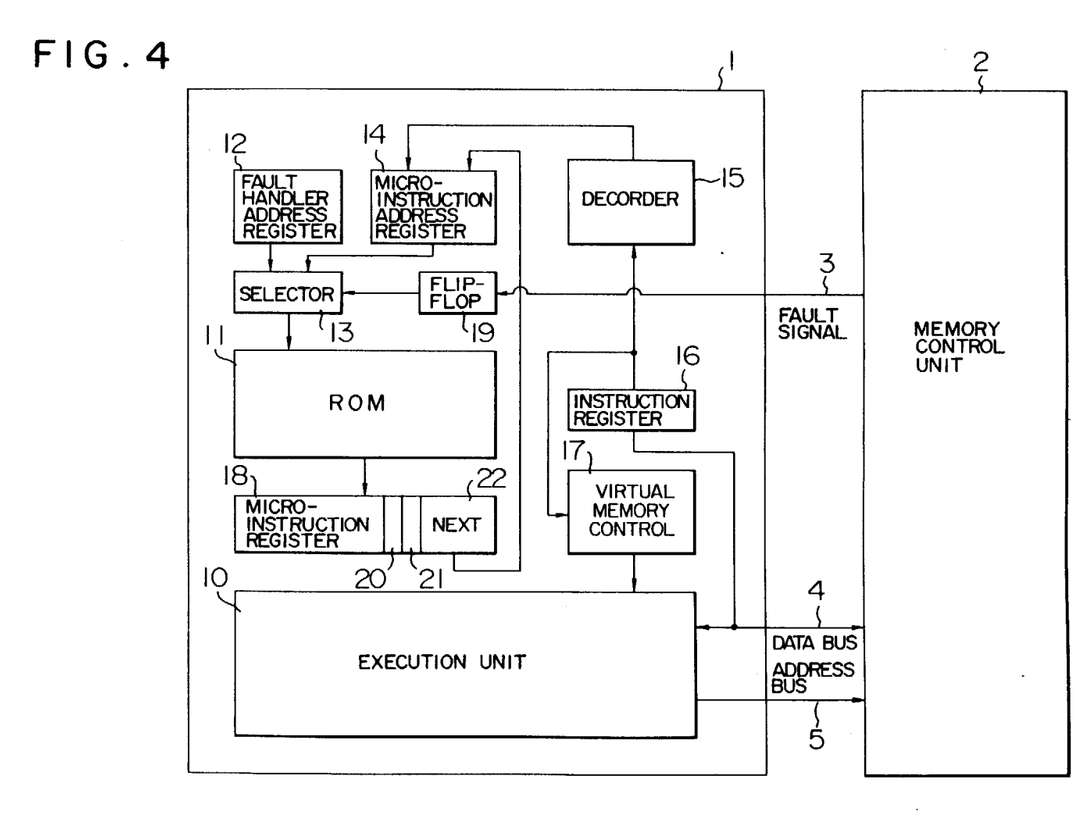
FIG. 4 shows a schematic diagram of a virtual memory system.

The embodiment of the invention will now be described hereinbelow. FIG. 4 shows a schematic diagram of the virtual memory system. In the figure, a miroprocesser 1 supplies a memory address 5 to a memory control unit MCU 2 and receives therefrom data or an instruction 4. In the microprocesser 1, the instruction received from the memory is set into an instruction register IR 16 and decoded by a decoder EEC 15 for execution of the instruction to produce a microinstruction address, which is set into a microinstruction address register MAR 14. In a normal instruction execution, a microinstruction is read out of a ROM 11 according to the microinstruction address and executed by an execution unit EU 10 by control of the microinstruction register 18.

When the memory (Physical memory) has no area corresponding to the memory address 5 transmitted to the memory control unit 2, the memory control unit 2 returns a fault signal 3 to the microprocessor 1. The fault signal 3 is synchronized and applied to a flip-flop 19 for setting the same. A set signal of the flip-flop 19 causes a selector SEL 13 to select a predetermined fault handler address stored in a FADR 12, which is processed in place of the microinstruction address set into the MAR 14.

Figure 5:
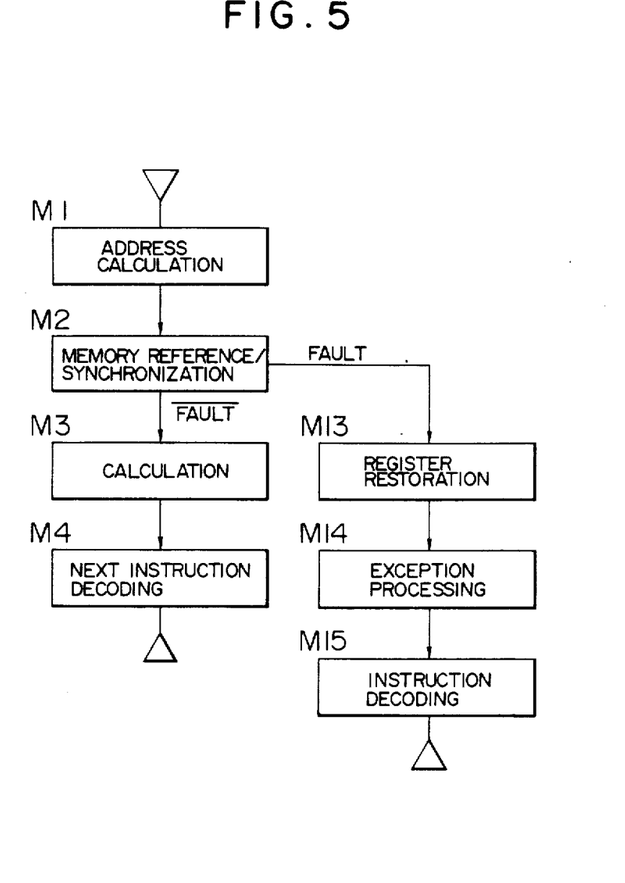
FIG. 5 shows a flow chart of the processes executed by the virtual memory system of FIG. 4.

The above processes are shown in FIG. 5 in a form of a flow chart. The instruction is decoded in the decoder 15 thereby producing a corresponding microinstruction address (M15). If no fault signal is asserted, the steps M1 to M3 are executed based on the microinstruction address and then to the step M4 for execution of the next instruction. If a fault signal 3 is asserted, the microinstruction 12 is executed and the exception processing is started.

Figure 1:
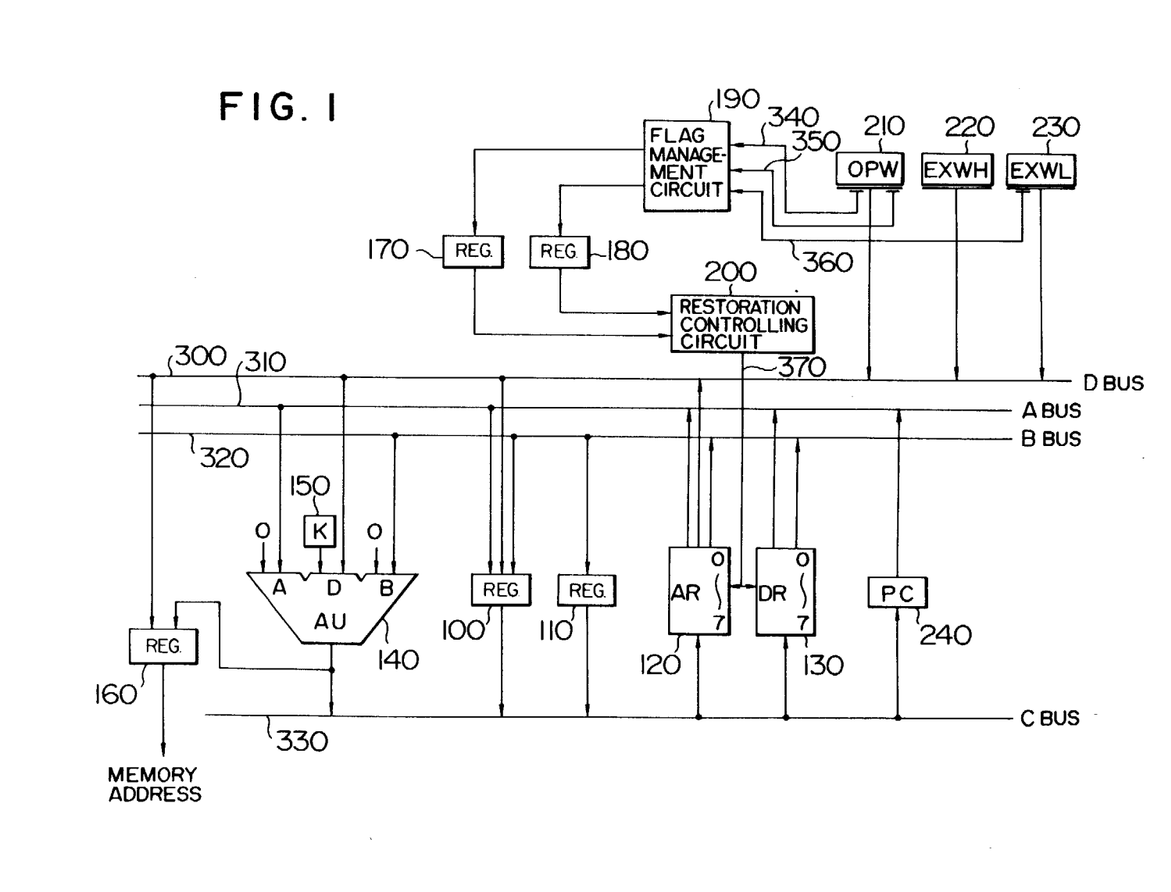
FIG. 1 is an example of a circuit diagram of the processor according to the present invention.

In FIG. 1, a circuit portion necessary for recovery of the content of a register is depicted and the other circuit portions of the virtual memory system are the same as a conventional device. FIG. 1 particularly shows general-purpose registers and an arithmetic unit for address calculation within the execution unit 10 of FIG. 4, and its associated circuitry including the virtual memory control (VCNT) 17 of FIG. 4.

The processor has as its user-visible, general-purpose registers, eight address registers 120 (hereinafter abbreviated as AR) and eight data registers 130 (hereinafter abbreviated as DR). The outputs of AR120 and DR130 are respectively connected to A bus 310 and B bus 320 to supply the contents thereof onto these busses. The output of AR120 is connected also to D bus 130. The inputs of AR120 and DR130 are connected to C bus 330 to fetch the contents on C bus 330. A bus 310, B bus 320, and D bus 300 are the input busses for the arithmetic unit and its associated circuitry, the inputs of various arithmetic units being connected to the input busses. The arithmetic unit 140 (hereinafter abbreviated as Au) shown in FIG. 1 is a three-input adder for calculation of an address. Au 140 has three inputs: A input, B input and D input. A input can select either the value on A bus 310 or zero, B input can select either the value on B bus 320 or zero, and D input can select either the value on D bus or the values 0, ±1, ±2, ±4 generated by a constant number generator 150.

C bus 330 is an output bus for the arithmetic unit, various values obtained by the arithmetic unit being supplied to C bus 330. PC 240 is a program counter.

AOR160 operates to store the value obtained by calculation of the effective address of an operand and deliver the memory address to the external memory of the processor. OPW210, EXWH220, and EXWL230 are instruction registers for holding an instruction word. OPW210 holds the operation word of the instruction, while EXWH220 and EXWL230 hold the extension words of the instruction.

SI100 and SJ110 are registers for saving the contents of the general-purpose registers, which perform one of the characteristic features of the present system. Both registers have the same bit length as of AR120 or DR130. The input of SI100 is connected to A bus 310, B bus 320 and D bus 300, enabling to fetch information on each bus. The output thereof is coupled to C bus 330 so that information saved at SI100 can be restored through C bus to AR120 or DR130. The input of SJ110 is coupled to B bus 320 so that information on B bus can be fetched. The output thereof is coupled to C bus so that the value of the output can be restored to AR120 or DR130.

FI170 and FJ180 are flag registers to store or memorize which general-purpose registers the contents saved in SI100 and SJ110 belong to. Both FI170 and FJ180 are of 16 bit length, each bit corresponding to a respective one of AR120 eight registers and DR130 eight registers. For example, if "1" is set at the third bit of FI170, it means that the value of the third register of AR120 before alteration is being saved in SI100. All of the bits in FI170 and FJ180 are cleared at the start of execution of each instruction.

A flag management circuit 190 sets the values described in the above paragraph at FI170 and FJ180. The circuit determines the values to be set at FI170 and FJ180, based on field information 340, 350 and 360 designating the general-purpose register number, among the head word and extension word of the instruction stored in OPW210, EXWH220 and EXWL230. The settings of the values to FI170 and FJ180 are carried out while the values of the general-purpose registers are actually saved to SI100 and SJ110.

A restoration controlling circuit 200 generates a set command signal 370 to set the value on C bus to AR120 or DR130. The circuit 200 can generate a set command signal 370 through indirect designation by FI170 or FJ180. For example, if the fourth bit of FI170 is "1", a set command signal for the fourth register of AR120 eight registers, is initiated. With this circuit, the values saved to SI100 and SJ110 can be restored through C bus 330 to address register 120 or data register 130.

Figure 6:
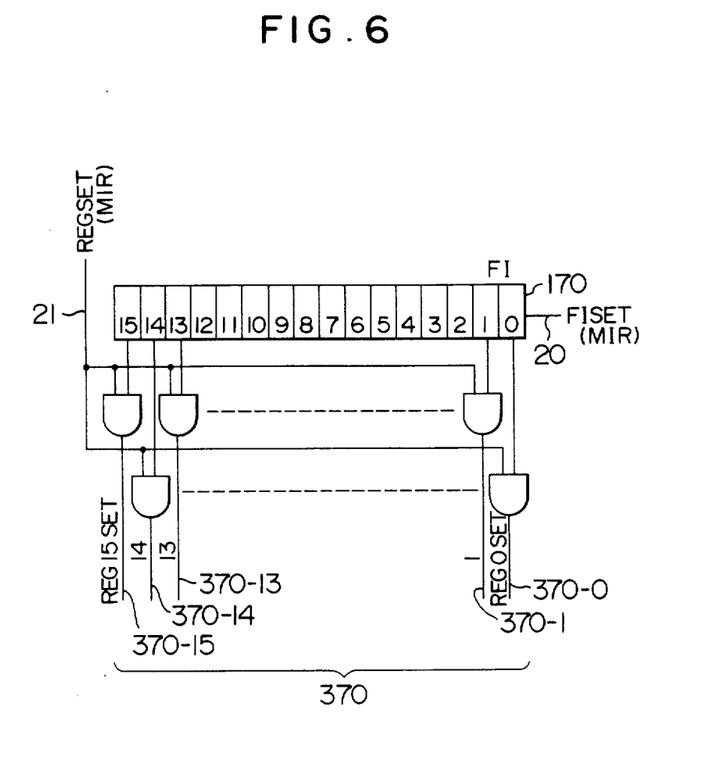
FIG. 6 shows a schematic diagram of the restoration controlling circuit 200.

FIG. 6 shows a schematic diagram of the circuit 200, in which the number of any register to be restored is supplied from a corresponding bit of a flag register FI 170 which is set by a flag register set signal FISET 20. When the fault exception processing is to be executed, a saving register set signal REGSET of "1" appears in the terminal 21 and a write signal 370 to the register to be restored is produced in the AND of the RESET bit and the corresponding register number bit.

The instruction format of the processor as well as the addressing modes for calculating the effective addresses of operands will be explained, and then the saving and restoration of the content of a general-purpose register will be described for each mode.

Figures 2A, 2B:
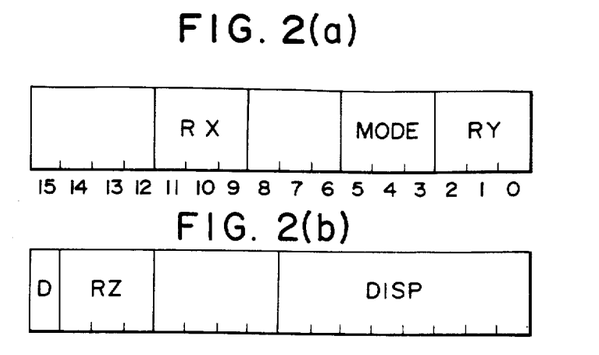
FIGS. 2a and 2b of an instruction format of the processor.
Figure 3:
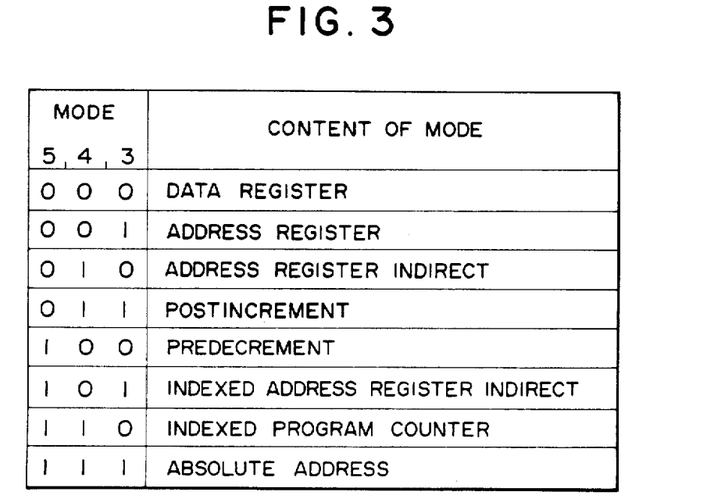
FIG. 3 shows an example of various addressing modes and their mode field bits in the instruction format.

FIGS. 2a and 2b show instruction formats of the processor. FIG. 2(a) is a typical format of the top 16 bits of an instruction. Bits 11 to 9 serve as an RX field representative of the general-purpose register number for an operand. Discrimination between the address register and data register is conducted by a different bit. Bits 5 to 3 serve as a Mode field representative of the addressing mode for another operand. Bits 2 to 0 serve as an RY field indicative of the general-purpose register number used in the addressing mode designated by Mode field. FIG. 3 is a table showing eight addressing modes to be designated by the Mode field. The contents of these addressing modes, calculation sequence of an effective address and a method to save the content of a general-purpose register as of FIG. 1, will now be described.

(1) Data Register Direct Mode, Address Register Direct Mode.

In both modes, the operand is the value per se of the data register or the address register. Therefore, neither calculation for an effective address nor saving for the content of a general-purpose register is necessary.

(2) Address Register Indirect Mode.

In this mode, the effective address of an operand is the value of the address register designated by the RY field. In FIG. 1, the effective address from AR120 is stored in AOR160 via D bus 300. While the value of AR120 is on the D bus, it is saved to in SI100. Simultaneously therewith, "1" is set at the bit position of FI170 corresponding to the address register number designated by the RY field of the instruction word. As such, the content of a general-purpose register can be saved in parallel with the processing to store the effective address in AOR, thereby avoiding any overhead in performance.

(3) Postincrement register Indirect Mode.

In this mode, the effective address of an operand is the value of the address register designated by RY field. The content of the address register is incremented by a constant numer. In FIG. 1, the effective address form AR120 is stored in AOR160 via D bus. Simultaneously therewith, the value of the address register is inputted to A input of Au140 via A bus from AR120, the constant number is inputted to D input from the constant number generator 150, and zero is inputted to B input. The addition result of these values is set at AR120 via C bus 330. The saving of the content of the address register to SI100 is the same as of (2).

(4) Predecrement Register Indirect Mode.

In this mode, the effective address of an operand is the value obtained by decrementing by a constant number the value of the address register designated by RY field by the constant number. The content of the address register is altered in accordance with the obtained value. In this case, in FIG. 1, the value of AR120 is inputted to A input of Au140 via A bus, a negative constant number is inputted to D input from the constant number generator 150, and zero is inputted to B input. Thus, the effective address is calculated and the result delivered from Au140 is stored in AOR160 and also set at AR120 via C bus. While the value of AR120 is on A bus, the value is saved to SI100. The setting of FI170 is the same as operation (2) explained above.

(5) Indexed Address Register Indirect Mode

In this mode, the instruction waits for an extension word. FIG. 2(b) shows the format of the extension word. The RZ field of the extension word indicates the general-purpose register number serving as an index register. Whether this register is a data register or an address register is decided by D bit. The Disp field indicates the value of displacement. In this mode, the effective address of an operand is the sum of the value of the address register serving as a base register and designated by the RY field, the value of the index register designated by D bit and the RZ field, and the value of displacement stored in the Disp field.

In this case, in FIG. 1, the value of the base register of AR120 is inputted to Au140 via A bus, the value of the index register of AR120 or DR130 is inputted to B input via B bus, and the value of displacement is inputted to D input via D bus from EXWL230 stored with the extension word. These values are added by Au140 to generate the effective address, which is stored in AOR160.

While the value of AR120 is on A bus 310, the value is saved in SI100. Also, while the value of AR120 or DR130 is on B bus 320, the value is saved in SJ110. Simultaneously therewith, "1" is set at FI170 bit position corresponding to the address number designated by the RY field of the instruction word. In addition, "1" is also set at FJ180 bit position corresponding to the address register number of the data register or address register designated by D bit of the extension word and the RZ field. Also in this case, saving of the content of the general-purpose register can be effected in parallel with calculation of the effective address so that no overhead in performance occurs.

(6) Indexed Program Counter Mode.

In this mode, the base register of mode (5) is replaced with the program counter. The same processings as (5) are conducted except that saving of the program counter is not effected.

(7) Absolute Data Addressing Mode.

In this mode, the effective address of an operand is the value stored in the extension word of an instruction. Since the effective address is not related to the general-purpose register, the content thereof is not saved.

As described in the foregoing, with the present system, saving of the content of the general-purpose register can be effected in parallel with calculation of the effective address. Therefore, no overhead in performance occurs.

Upon detection of a page fault during execution of instructions, restoration of the contents saved in SI100 and SJ110 is performed by the circuit 200 before re-execution of the instructions. The sequence of processings has been described in connection with the circuit 200. Restoration of the content of the general-purpose register by the circuit 200 is initiated by microinstructions for exception processing.

A preferred embodiment of the present system has been described in the foregoing. It is apparent that the system is also applicable to a processor having a different instruction format and addressing mode.

Since the value of the general-purpose register is saved in Move instruction for plural words, the instruction can be resumed by merely restoring the saved value in case a page fault occurs at a certain word.

According to the present invention, since the general-purpose registers to be restored at re-execution of instructions are restricted only to those necessary for calculation of the effective address of an operand, re-execution of instructions can be effected with a small quantity of hardware. Further, since the system can effect saving of the general-purpose register in parallel with calculation of the effective address, overhead in performance for supporting the virtual memory is short.

We claim:

1. A processor for supporting a virtual memory system comprising:

a plurality of general-purpose registers for storing information;

a plurality of saving registers for saving information contained in at least one of said plurality of general-purpose registers during an addressing operation for said virtual memory system;

first bus means connected to an output of each of said plurality of general-purpose registers and to an input of each of said plurality of saving registers;

second bus means connected to an input of each of said plurality of general-purpose registers and to an output of each of said plurality of saving registers;

address calculation means, having an input connected to said first bus means and an output connected to said second bus means, for generating addresses to address said virtual memory system in response to information which is received from said general-purpose registers and simultaneously saved in said saving registers;

flag register means for storing discriminating information indicating which of said plurality of general-purpose registers have information saved in said plurality of saving registers; and restoration controlling means connected to said flag register means and said general-purpose registers and responsive to a fault exception signal from said virtual memory system for re-storing at least that part of the information saved in said plurality of saving registers to a general-purpose register which is indicated by said discrimination information stored in said flag register means.

2. A processor according to claim 1, further comprising means for causing said restoration controlling means to restore an effective address when a page fault occurs during execution of an instruction and while addressing said virtual memory system using address data contained in the instruction, by transferring the information in said saving register to the general-purpose register which is indicated by said discrimination information for re-execution of the instruction.

3. A processor according to claim 1, wherein said general-purpose register is an address register for storing address data which is used for obtaining an effective address, said address data being transferred through said first bus means to said saving register means and retransferred from said saving register means to said address register through said second bus means.

4. A processor according to claim 1, further comprising a constant number generator means connected to said address calculation means for providing a constant number which is added to the address data in said address calculation means for producing said effective address.

5. A processor for supporting a virtual memory system comprising:

a plurality of general-purpose registers for storing information;

means including a plurality of saving registers for saving information contained in at least one of said plurality of general-purpose registers during an addressing operation for said virtual memory system;

first bus means connected to an output of each of said plurality of general-purpose registers and to an input of each of said plurality of saving registers;

second bus means connected to an input of each of said plurality of general-purpose registers and to an output of each of said plurality of saving registers;

flag register means for storing discriminating information indicating which of said plurality of general-purpose registers have information saved in said plurality of saving registers; and restoration controlling means connected to said flag register means and said general-purpose registers and responsive to a fault exception signal for from said virtual memory system for re-storing at least that part of the information saved in said plurality of saving registers to a general-purpose register which is indicated by said discrimination information stored in said flag register means, wherein said flag register means includes a plurality of bit areas corresponding to the number of said plurality of general-purpose registers, each of said bit areas including a flag means indicative of whether the information of an associated general-purppose register is saved in said saving registers.

6. A processor according to claim 5, further comprising means for executing instruction received from said virtual memory system, and a flag management circuit for determining which of said flag register means at each of said bit areas is to be set for a given instruction to be executed, including means for clearing said flag register means at the start of execution of an instruction.

7. A processor according to claim 6, wherien said flag management circuit sets the flag means at the bit areas of said flag register means for the general-purpose register instruction.

8. A processor according to claim 7, wherein said restoration controlling means restores the information contained in said saving registers to the general-purpose register which corresponds to a set flag means in the associated bit area of said flag register means.

* * * * *